J. F. WAGNER.
JUNCTION BOX.
APPLICATION FILED AUG. 23, 1911.
1,064,033.
Patented June 10, 1913.
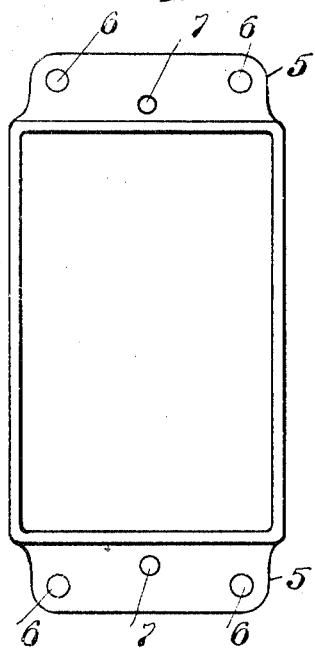
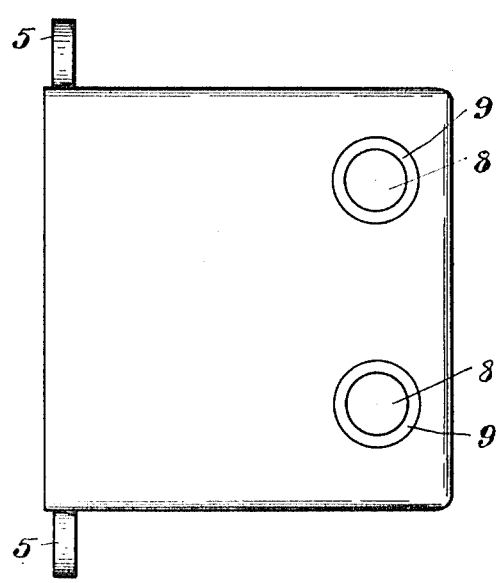
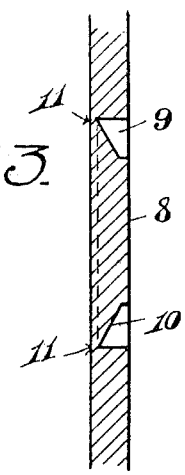
Witnesses:
Samuel Schwartz
Agnes Gordon
Joseph F. Wagner,
Inventor
By George J. Oltsch.
Attorney.

UNITED STATES PATENT OFFICE.

JOSEPH F. WAGNER, OF SOUTH BEND, INDIANA, ASSIGNOR TO ARNOLD-WAGNER ELECTRIC CO., OF SOUTH BEND, INDIANA, A CORPORATION OF INDIANA.

JUNCTION-BOX.

1,064,033.        Specification of Letters Patent.        Patented June 10, 1913.

Application filed August 23, 1911. Serial No. 645,525.

*To all whom it may concern:*

Be it known that I, JOSEPH F. WAGNER, a citizen of the United States, residing at South Bend, in the county of St. Joseph and State of Indiana, have invented certain new and useful Improvements in Junction-Boxes, of which the following is a specification.

My invention relates to junction boxes of the type commonly used in equipping a building with an electric lighting system, and particularly of that type of box which is mounted in the wall of a room to receive and support a switch for turning the lights on and off.

The object of my invention is to improve the construction of such boxes with respect to the manner of forming the knockout portions thereof, in order to provide holes in the walls of the box to receive the ends of conduits through which the current conducting wires are passed. As it is not known how many conduits are to enter a box or through which wall they will enter, the box is usually provided with two or more knockout portions on each side thereof, so that a workman may, by giving the knockout portions a sharp tap with a hammer, provide the exact number of holes desired, as is well understood in the art. It is the present practice in manufacturing junction boxes out of ductile sheet metal, to punch the holes in the box and replacing the plugs, disks or blanks punched out to fill up the holes, the same being held in place by friction or by auxiliary means. The knockout plugs are also formed by cutting entirely through the metal with the exception of one or two places, so that there will be a connecting link between the plug and the wall of the box to hold the plug in place; such methods of manufacture, however, not providing a waterproof box, which defect it is the object of my invention to overcome, as well as to simplify and cheapen the cost of production.

With the above and other objects in view, the present invention consists of certain novel features of construction hereinafter more particularly described, pointed out in the appended claims, and illustrated in the accompanying drawings, it being understood that minor changes of construction may be made without departing from or sacrificing any of the advantages of the invention.

In the drawings, which illustrate the preferred embodiment of my invention—Figure 1 is an end elevation of the junction box. Fig. 2 is a side elevation thereof, and Fig. 3 is an exaggerated fragmentary view in section of a portion of the box.

Referring now more particularly to the accompanying drawings, the junction box represented is of the familiar rectangular form, and is provided with the customary flanges 5, adjacent the front, open ended portion of the box, screw-holes 6 being provided for securing the box to the studding or other frame work of a building, and threaded apertures 7 to receive screws for securing the face plate (not shown) to the box. Each box is usually provided with a series of knockout portions 8, to provide openings in the walls thereof to admit conduits or conductors, and as it is not always known from which side of the box they will enter, and the number thereof, the box is provided on each of its sides and rear end with two or more knockout portions, so that the same may be readily adapted to meet all contingencies that may arise in the use for which the boxes are intended. For present purposes one side of the box only is shown, as it is immaterial how many of the knockout portions are provided, or the location thereof, the gist of my invention residing in the manner of forming such knockout portions.

I prefer to make the box of cast-iron, and with a suitable machine operated tool cut a circular groove 9 in the outer side of the side, top and bottom sections of the box, the bottom of the groove having a taper 10, so that the groove will have its greatest depth at the outer circumference thereof and the wall correspondingly having its weakest portion at that point, as indicated at 11. By giving the groove a bevel, the wall is thicker at every point than at the outer circumference thereof, and as a result when the portion within the groove is knocked out by giving the same a sharp tap with a hammer, the breaking of the metal will occur along the outer edge of the groove where the wall of the box is the thinnest. Instead of such breakage being of irregular formation and leaving a ragged edge, as would be the case were the groove of equal depth throughout, the break follows a true line represented by the greatest depth of the groove, leaving a smooth edge and finish to the metal, and having every appearance of the cutting tool having passed entirely through the wall, instead of having been partially broken away.

Having thus described my invention, what is claimed is:—

1. A junction box for electric wires having one or more knockout portions formed by grooves cut in the walls thereof, the outer edge of the groove being cut to the greatest depth.

2. A junction box for electric wires having a series of circular knockout portions formed in the walls thereof by grooves cut therein, the bottom of the grooves tapering so as to form the weakest portion of the wall at the outer edge of the grooves.

3. A junction box for electric wires having a plurality of annular grooves in its side walls forming knock-out portions, the side walls of the grooves being substantially perpendicular to the walls of the box and with the bottom walls of the grooves decreasing in thickness from the inner peripheries of the grooves toward the outer peripheries.

4. A junction box for electric wires having a series of circular knock-out portions formed in the walls thereof by grooves cut therein, the side walls of the grooves being perpendicular to the walls of the box and with the bottoms of the grooves sloping downwardly and outwardly from their inner peripheries toward their outer peripheries, the depths of the grooves being the greatest at their outer peripheries.

In testimony whereof I affix my signature in presence of two witnesses.

JOSEPH F. WAGNER.

Witnesses:
 SAMUEL SCHWARTZ,
 FLOYD A. DEAHL.